Nov. 5, 1929.    A. K. YGGER    1,734,456
RECORDING WEIGHING SCALES SWITCH
Filed April 17, 1928
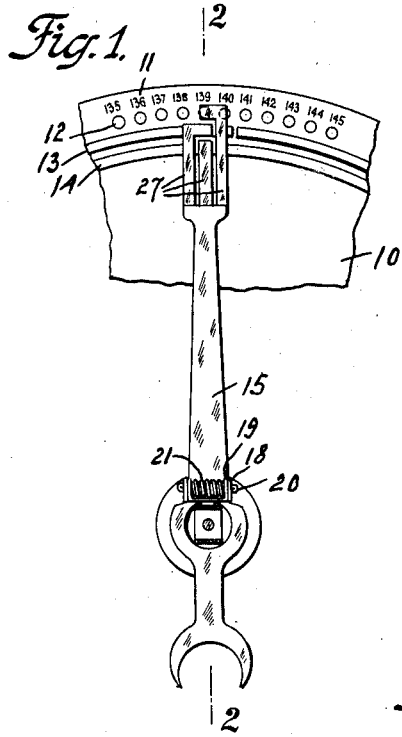
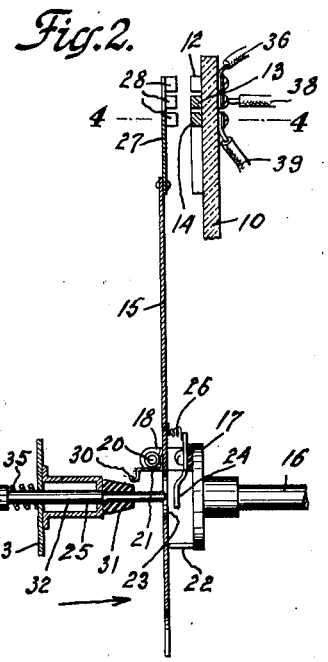
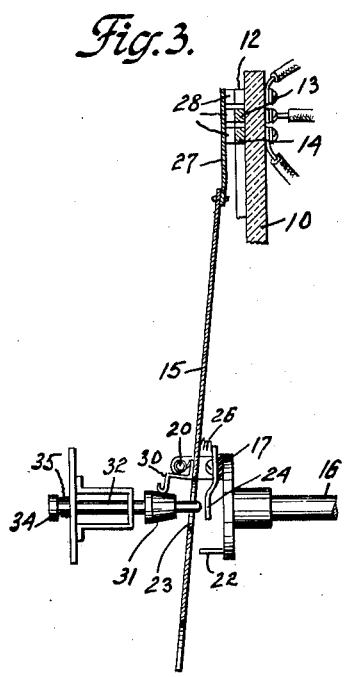
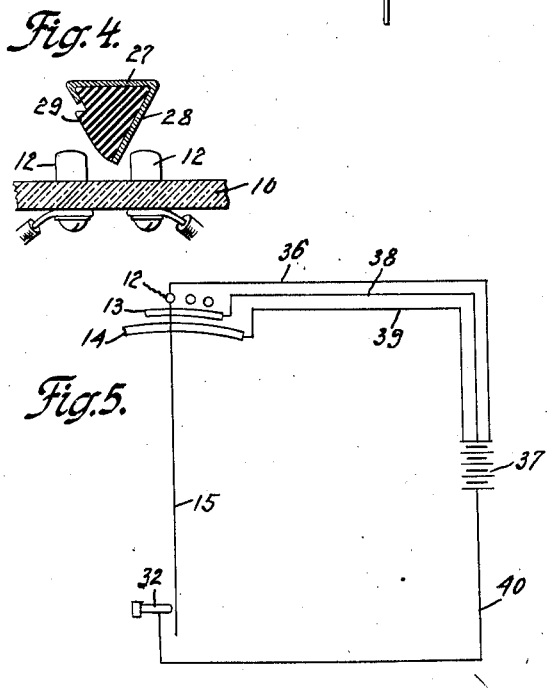
INVENTOR
Albert Karlsson Ygger
BY
Sigmund Sherzog
ATTORNEY Patented Nov. 5, 1929

1,734,456

UNITED STATES PATENT OFFICE

ALBERT KARLSSON YGGER, OF NEW YORK, N. Y.

RECORDING-WEIGHING-SCALES SWITCH

Application filed April 17, 1928. Serial No. 270,732.

The present invention relates to improvements in recording scales, and more particularly to electrically operated devices of this type.

In one type of these devices a contact arm is associated with and oscillates synchronously with the pointer of the scale, which contact arm moves over electrical contacts corresponding with the graduations of the scale and may be brought into contact with one or more of the said contacts, whereby electric circuits are closed, energizing electro-magnets co-operating with the printing apparatus of the scale. These devices are rather complicated, and have an objectionable feature which consists in that the contact points on the contact arm and also the contact points co-operating therewith wear away gradually, due to the frequent making and breaking of the circuits in the operation of the device.

The main object of the invention is to simplify the constructions heretofore in use by combining the pointer or hand of the scale with the contact arm thereof, that is to say by providing a hand which acts at the same time as the contact arm of the recording scale.

Another object of the invention is to so construct the contact arm and its operating mechanism that the making and breaking of the circuits does in no way influence or affect the contact points on the arm and on the dial of the device.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1 is a front elevation of a portion of a dial, the combined hand and contact arm and the elements co-operating therewith; Fig. 2 is a section taken on line 2—2 of Fig. 1; Fig. 3 is a similar section with the elements in other positions; Fig. 4 is a section taken on line 4—4 of Fig. 2, on a larger scale; and Fig. 5 is a diagram of the electric circuits of the device.

In the drawings, the numeral 10 indicates the dial of a scale, the same being stationary and provided with the usual graduations 11. On the dial are also provided contacts 12, 13 and 14, arranged on circles and insulated from each other. The number of contacts and the positions of the same in relation to one another depend on the graduations of the scale. If, for instance, the capacity of the scale is 1,000 pounds and the smallest graduation of the scale is one pound, the contacts 12 for pounds, the contacts 13 for ten pounds and the contacts 14 for one hundred pounds must be arranged in groups of ten, and all contacts with the same index numerals are electrically connected to one another and by a conductor to a relay, not shown, in the circuit of the printing apparatus. This arrangement is well known in constructions heretofore in use, so that a further detailed description thereof seems to be unnecessary.

With the scale graduations co-operates a hand 15, carried by an oscillatable hand-shaft 16. This shaft has fixed to it a flange 17, on which are mounted two lugs 18, to which the hand is pivotally attached. For the last-mentioned purpose the hand has rigidly fastened thereto a bail-shaped element 19, the pivot pin 20, connecting said hand and the lugs 18, extending through said bail-shaped element and said lugs. About the pivot pin is wound a coil spring 21, which has a tendency to swing the hand on the said pivot pin into abutment with a stop 22 on the flange 17. In the last-mentioned position the hand extends in parallel relation to the dial 10, as clearly shown in Fig. 2 of the drawings. The hand is provided with an aperture 23, in alignment with the shaft 16, and the flange 17 has fixed to it, but insulated therefrom, a contact 24, which is disposed in rear of the hand and projects within the area of said aperture, for co-operation with a circuit closer 25 to be hereinafter more fully described. The contact 24 is connected with the hand by a wire connector 26, the said hand being made of metal.

To the hand are fixed three leaf springs 27, each carrying at its end a finger 28, in co-operative relation to one of the series of the stationary contacts 12, 13 and 14. As appears from Fig. 4 of the drawings, each of the fingers carries an insulating block 29, preventing the finger from bridging two adjacent stationary contact points of a series.

To the hand is attached in any suitable manner a projection 30, which extends in front of the said hand and is disposed in the path of a frustum of a cone 31, that is made of insulating material and fixedly attached to a pin 32, the latter being shiftably mounted in the direction of its longitudinal axis on a support 33. This support is carried by a stationary part of the scale and is insulated from the mechanism of the latter. The pin is adapted to be projected through the aperture 23, and carries upon its outer end a knob 34. Between this knob and the said support is inserted a spring coil 35, which has a tendency to keep the pin in its outer position (Fig. 2), in which it does not contact with the contact 24 above described. The element 31 serves as a stop, limiting the outward movement of the pin 32, and is constructed so as to co-operate with the projection 30, the latter being disposed in the path of the said element.

All contacts 12 with the same index numerals are connected by wires 36 with one terminal of an electric battery 37. Similarly, all contacts 13 with the same index numerals are electrically connected by wires 38 with the same terminal, and all contacts 14 are connected by wires 39 with the same terminal. The other terminal of the electric battery is connected by the wire 40 with the pin 32. The contact 24 is connected by the wire connector 26 with the hand 15, as above mentioned.

In the connections between the contacts 12, 13 and 14 and the battery are inserted relays, not shown, the latter being in the circuit of the printing apparatus. Inasmuch as these elements are well known, their construction and operation need not be described herein.

The operation of this device is as follows: When a load is placed on the scale, the hand 15 is moved from zero position the appropriate distance, whereby the fingers 28 are brought in register with the corresponding contacts 12, 13 and 14. As appears from Fig. 2 of the drawings, the circuit closer 25 does not interfere with this movement of the hand, the projection 30 being out of contact with the frustum of a cone, designated by the numeral 31. As soon as the hand has come to a full stop, the operator moves the pin 32 in the direction of the arrow shown in Fig. 2 of the drawings, whereby the frustum of a cone is brought into engagement with the projection 30. In the continued inward movement of the said pin the hand 15 is tilted on its pivot pin 20 so as to bring the fingers 28 into contact with the stationary contact points 12, 13 and 14 in alignment therewith. During the further inward movement of the pin the fingers remain in contact with the said contact points and the pin makes an electrical contact with the contact 24, whereby the respective electric circuits are closed energizing the relays, and the latter causing an operation of the printing mechanism. As soon as the printing mechanism has preformed its function, the pin 32 is released, whereby the spring 35, which has been compressed during the inward movement of the pin, causes the latter to move to its outer, normal position, shown in Fig. 2 of the drawings. As soon as the pin is released, its contact with the contact 24 is broken, but the contact between the fingers 28 and the contact points 12, 13 and 14 is broken only after the frustum of a cone is disengaged from the projection 30.

From the foregoing it appears that the hand 15 has a twofold function, to wit: It serves as a pointer co-operating with the dial of the scale, and, second, it constitutes the contact arm of the mechanism. It also appears that sparking cannot take place when the fingers 28 are engaged with or disengaged from the contacts 12, 13 and 14. These fingers and the last-mentioned contacts will, therefore, not wear. The circuit is closed and opened by the pin 32, while the fingers 28 and contacts 12, 13 and 14 are is engagement.

What I claim is:

1. A recording weighing scale comprising a graduated dial, an oscillatable shaft, a hand carried by said shaft for co-operation with the graduations of said dial, said hand being pivoted to said shaft so as to be adapted to swing in a plane at right angles to the face of said dial, electrical contacts on said dial corresponding with the graduations thereof, a plurality of fingers on said hand in alignment with said contacts and being adapted to move over the same, a contact fixed to said shaft and insulated therefrom but electrically connected with said fingers, and a shiftable circuit closer for co-operation with the contact on said shaft for causing contacts to be made between said fingers and the contacts on said dial before it makes an electric contact with the contact on said shaft.

2. A recording weighing scale comprising a graduated dial, an oscillatable shaft, a hand carried by said shaft for co-operation with the graduations of said dial, said hand being pivoted to said shaft so as to be adapted to swing in a plane at right angles to the face of said dial, electrical contacts on said dial corresponding with the graduations thereof, a plurality of fingers on said hand in alignment with said contacts and being adapted to move over the same, a contact fixed to said shaft and insulated therefrom but electrically connected with said fingers, a circuit closer for co-operation with the contact on said shaft, and coacting means on said hand and circuit closer for causing contacts to be made between said fingers and the contacts on said dial before said circuit closer makes an electric contact with the contact on said shaft.

3. A recording weighing scale comprising a graduated dial, an oscillatable shaft, a hand carried by said shaft for co-operation with the graduations of said dial, said hand being pivoted to said shaft so as to be adapted to swing in a plane at right angles to the face of said dial, electrical contacts on said dial corresponding with the graduations thereof, a plurality of fingers on said hand in alignment with said contacts and being adapted to move over the same, a contact fixed to said shaft and insulated therefrom but electrically connected with said fingers, a shiftable circuit closer including a pin for co-operation with the contact on said shaft, a projection fixed to said hand, a frustum of a cone on said pin, said projection being in the path of said frustum of a cone and so arranged that said hand is tilted upon movement of said pin to bring its fingers into electric contact with the contacts on said dial before said pin makes an electric contact with the contact on said shaft.

Signed at New York, in the county of New York, and State of New York, this 21st day of March, A. D. 1928.

ALBERT KARLSSON YGGER.